Jan. 13, 1925.
R. M. ROBINSON
TROLLEY PAN
Filed Dec. 22, 1923
1,522,790
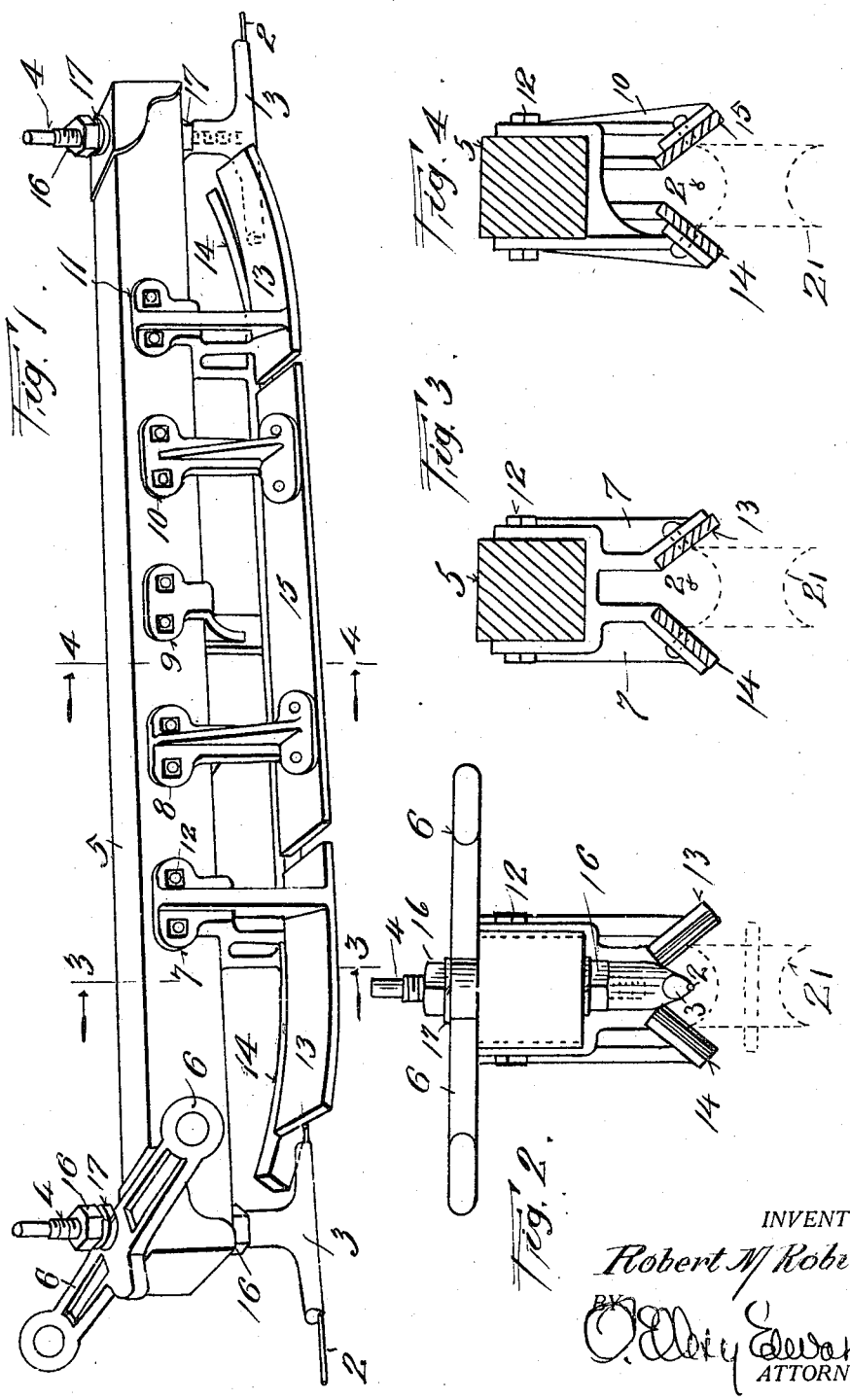
INVENTOR
Robert M Robinson
BY
O. Alley Edwards
ATTORNEY Patented Jan. 13, 1925.

1,522,790

UNITED STATES PATENT OFFICE.

ROBERT M. ROBINSON, OF LOUISVILLE, KENTUCKY, ASSIGNOR TO CHEATHAM ELECTRIC SWITCHING DEVICE CO., INC., OF LOUISVILLE, KENTUCKY, A CORPORATION OF KENTUCKY.

TROLLEY PAN.

Application filed December 22, 1923. Serial No. 682,237.

*To all whom it may concern:*

Be it known that I, ROBERT M. ROBINSON, a citizen of the United States, and a resident of the city of Louisville, county of Jefferson, and State of Kentucky, have invented a new and useful Improvement in Trolley Pans, of which the following is a specification.

The object of my invention is to provide a trolley pan which will allow a trolley wheel to make certain circuits while off a trolley wire and which will be light, durable and reliable in construction and action and easily adjustable to all conditions of service. This and other objects are accomplished by my invention, one embodiment of which is hereinafter more particularly set forth.

For a more particular description of my invention, reference is to be had to the accompanying drawings, forming a part hereof, in which—

Figure 1 is a perspective view of a trolley pan embodying my invention.

Figure 2 is an end elevation of the same.

Figures 3 and 4 are sectional views, taken on the lines 3—3 and 4—4 respectively, of Figure 1, looking in the direction of the arrows.

Throughout the various views of the drawings, similar reference characters designate similar parts.

A trolley pan 1 is mounted on a suitable trolley wire 2 of the conventional kind by means of two ears 3, one at each end which are adjustably mounted on bolts or screws 4 which pass through a longitudinal bar of wood or other insulating material 5 to hold the same at any desired level with regard to the trolley wire. In the preferred embodiment of my invention, one of the screws 4 is provided with a washer or nut with laterally extending arms 6 which are perforated at each end to receive guy wires, not shown.

Hung from the bar 5 are a number of brackets 7, 8, 9, 10 and 11 each of which is secured to the bar by means of suitable bolts or screws 12. The end brackets 7 and 11 are shod at their lower ends with the diagonally displayed plates 13 and 14 which are flared upwardly towards the bar at their outer ends so as to engage a trolley wheel and remove it from the trolley wire or replace it on such wire as it passes under them. The plate 14 extends the length of the active part of the trolley pan and from adjacent to one ear 3 to the other 3, as shown. It is supported in its middle by means of the bracket 9. The plates 13 are not continuous, but are interrupted with an air gap between them and this air gap is partially filled by means of a plate 15 which is suspended from the lower ends of the brackets 8 and 10 and joins them, as shown. In the preferred embodiment of my invention all of the brackets 7, 8, 9, 10 and 11 engage both sides of the bar 5, as shown in Figures 3 and 4.

In view of the foregoing, the use of my improved trolley pan will be readily understood. The ears 3 are first put in place and the nuts 16 and locking device 17, if any, are so adjusted that the bar 5 is at the right level with regard to the trolley wire 2. When so adjusted, the nuts are fixed, the guy wires set and the trolley pan is ready for use and it is used in the conventional manner so that the trolley wheel 21 passing along the trolley wire 2 will press against the underside of the bars 13, 14 and 15, the bars 13 and 14 at their ends separating the trolley wheel from the trolley wire or restoring it to the trolley wire, as the case may be, and in the middle the trolley wheel bridges between the plate 14 and plate 15 while off the trolley wire.

While I have shown and described one embodiment of my invention, it is obvious that it is not restricted thereto, but that it is broad enough to cover all structures that come within the scope of the annexed claim.

Having thus described my invention, what I claim is:

A trolley pan, a bar with ears at each end and bolts with nuts connecting the bar and said ears so that the bar may be adjustably mounted on said ears to raise or lower the same with regard to a trolley wire held by said ears, brackets engaging opposite sides of said bar and diagonally disposed deflecting and guide plates carried by said brackets away from said bar and separated from said bar, said plates on one side being divided into sections so as to have an insulated section on which a trolley wheel can rest when in contact with an opposed plate while off the trolley wire.

In testimony whereof, I have hereunto set my hand this 6th day of November, 1923.

ROBERT M. ROBINSON.